(12) United States Patent
Clark

(10) Patent No.: US 7,195,435 B2
(45) Date of Patent: Mar. 27, 2007

(54) PARTITION SYSTEM

(75) Inventor: Toby W. Clark, Phenix City, AL (US)

(73) Assignee: Illinois Tool Works Inc., Glenview, IL (US)

( * ) Notice: Subject to any disclaimer, the term of this patent is extended or adjusted under 35 U.S.C. 154(b) by 141 days.

(21) Appl. No.: 11/042,146

(22) Filed: Jan. 26, 2005

(65) Prior Publication Data

US 2005/0163584 A1 Jul. 28, 2005

Related U.S. Application Data

(60) Provisional application No. 60/539,107, filed on Jan. 27, 2004.

(51) Int. Cl.
*B61D 45/00* (2006.01)
(52) U.S. Cl. ..................................... 410/135
(58) Field of Classification Search ................ 410/121, 410/129, 130, 135, 136, 139, 142, 150
See application file for complete search history.

(56) References Cited

U.S. PATENT DOCUMENTS

| | | |
|---|---|---|
| 1,061,974 A | 5/1913 | Bohn |
| 1,085,285 A | 1/1914 | Monesmith |
| 1,193,255 A | 8/1916 | Gibbs |
| 1,896,198 A | 2/1933 | MacMillan |
| 1,970,610 A | 8/1934 | McMullen et al. |
| 2,165,463 A | 4/1939 | Angell |
| 2,324,721 A | 7/1943 | O'Connor |
| 2,346,853 A | 4/1944 | Lundvall |
| 2,516,527 A | 7/1950 | Oltz |

(Continued)

FOREIGN PATENT DOCUMENTS

CA 763727 B1 7/1967

(Continued)

OTHER PUBLICATIONS

ROM Corporation trade literature; believed to have been published prior to Jul. 15, 2002; 6 pages.

(Continued)

*Primary Examiner*—H. Gutman
(74) *Attorney, Agent, or Firm*—Banner & Witcoff, Ltd.

(57) ABSTRACT

A partition system includes partial-width partitions that are independently movable longitudinally in the trailer and independently swung to the ceiling for easy stowing. Each partition is evenly supported by a pair of rails for easy movement without undue loading of the components. One rail extends along the sidewall and another along the center of the trailer for each partition. All of the rails are part of a framework that is supported solely by the sidewalls with no loads placed on the ceiling. A lift assembly includes a lift rope, a pair of pulleys and a grip for holding the lift rope. A first pulley is generally aligned with the center of the partition to avoid substantial side loading on the pulleys during lifting and lowering of the partition. A second pulley guides the lift rope to a sidewall where it is less disruptive to the loading and unloading of goods. The grip is proximate the ceiling and avoids the formation of a taut rope segment along the sidewall. The grip has a simple construction that reliably holds the partition in the loading position as needed.

20 Claims, 9 Drawing Sheets

U.S. PATENT DOCUMENTS

| | | |
|---|---|---|
| 2,725,827 A | 12/1955 | Wehby |
| 2,752,864 A | 7/1956 | McDougal et al. |
| 2,866,419 A | 12/1958 | Candlin |
| 2,895,431 A | 7/1959 | Ford |
| 3,017,842 A | 1/1962 | Nampa |
| 3,017,843 A | 1/1962 | Loomis et al. |
| 3,057,284 A | 10/1962 | Learmont |
| 3,062,156 A | 11/1962 | Talmey |
| 3,063,388 A | 11/1962 | Magarian et al. |
| 3,070,044 A | 12/1962 | Tobin |
| 3,144,839 A | 8/1964 | Palsson |
| 3,162,146 A | 12/1964 | Knippel et al. |
| 3,164,395 A | 1/1965 | Burch et al. |
| 3,176,629 A | 4/1965 | Shaver |
| 3,208,403 A | 9/1965 | Magarian et al. |
| 3,217,664 A | 11/1965 | Aquino et al. |
| 3,298,143 A | 1/1967 | Rogers et al. |
| 3,336,880 A | 8/1967 | Johnston |
| 3,358,617 A | 12/1967 | Erickson |
| 3,376,599 A | 4/1968 | Singer |
| 3,413,932 A | 12/1968 | Bennett |
| 3,438,149 A | 4/1969 | Ilg |
| 3,680,492 A | 8/1972 | Weage |
| 3,791,311 A | 2/1974 | Loomis |
| 4,019,442 A | 4/1977 | Lee et al. |
| 4,049,311 A | 9/1977 | Dietrich et al. |
| 4,265,577 A | 5/1981 | Loomis |
| 4,281,870 A | 8/1981 | Ehrlich et al. |
| 4,639,031 A | 1/1987 | Truckenbrodt |
| 4,880,342 A | 11/1989 | Pradovic |
| 4,886,404 A | 12/1989 | Jensen et al. |
| 5,010,943 A | 4/1991 | Boyer |
| 5,054,295 A | 10/1991 | Goulooze |
| 5,161,848 A | 11/1992 | Lutton |
| 5,386,674 A | 2/1995 | Sfirakis et al. |
| 5,664,386 A | 9/1997 | Palmersten |
| 5,704,676 A | 1/1998 | Hill |
| 5,984,601 A | 11/1999 | Jevaney et al. |
| 6,017,175 A | 1/2000 | Kassab et al. |
| 6,247,740 B1 | 6/2001 | Smith |
| 6,606,875 B1 | 8/2003 | Grand et al. |
| 6,626,625 B2 | 9/2003 | Nelson et al. |
| 6,857,834 B2 | 2/2005 | Nelson et al. |

FOREIGN PATENT DOCUMENTS

| | | |
|---|---|---|
| GB | 2238988 A1 | 6/1991 |
| JP | 2002331888 A | 11/2002 |

OTHER PUBLICATIONS

Load-Lok Cargo Restraint Systems trade literature; believed to have been published prior to Jul. 15, 2002; 5 pages.

Tempar Incorporated trade literature; believed to have been published prior to Jul. 15, 2002; 17 pages.

Schmitz Cargobull trade literature; believed to have been published prior to Jul. 15, 2002; 12 pages.

Randall Manufacturing trade literature; believed to have been published prior to Jul. 15, 2002; 14 pages.

ROM Corporation "Generation II" trade literature; believed to have been published prior to Jul. 15, 2002; 6 pages.

Loadmaker trade literature; believed to have been published prior to Jan. 27, 2004; 6 pages.

"ISOWALL" trade literature; believed to have been published prior to Jul. 2002; 1 page.

Donovan Enterprises product literature; published and/or describing products available prior to Nov. 12, 2003; 16 pages.

Donovan Enterprises product literature; published prior to Jul. 10, 2002; 21 pages.

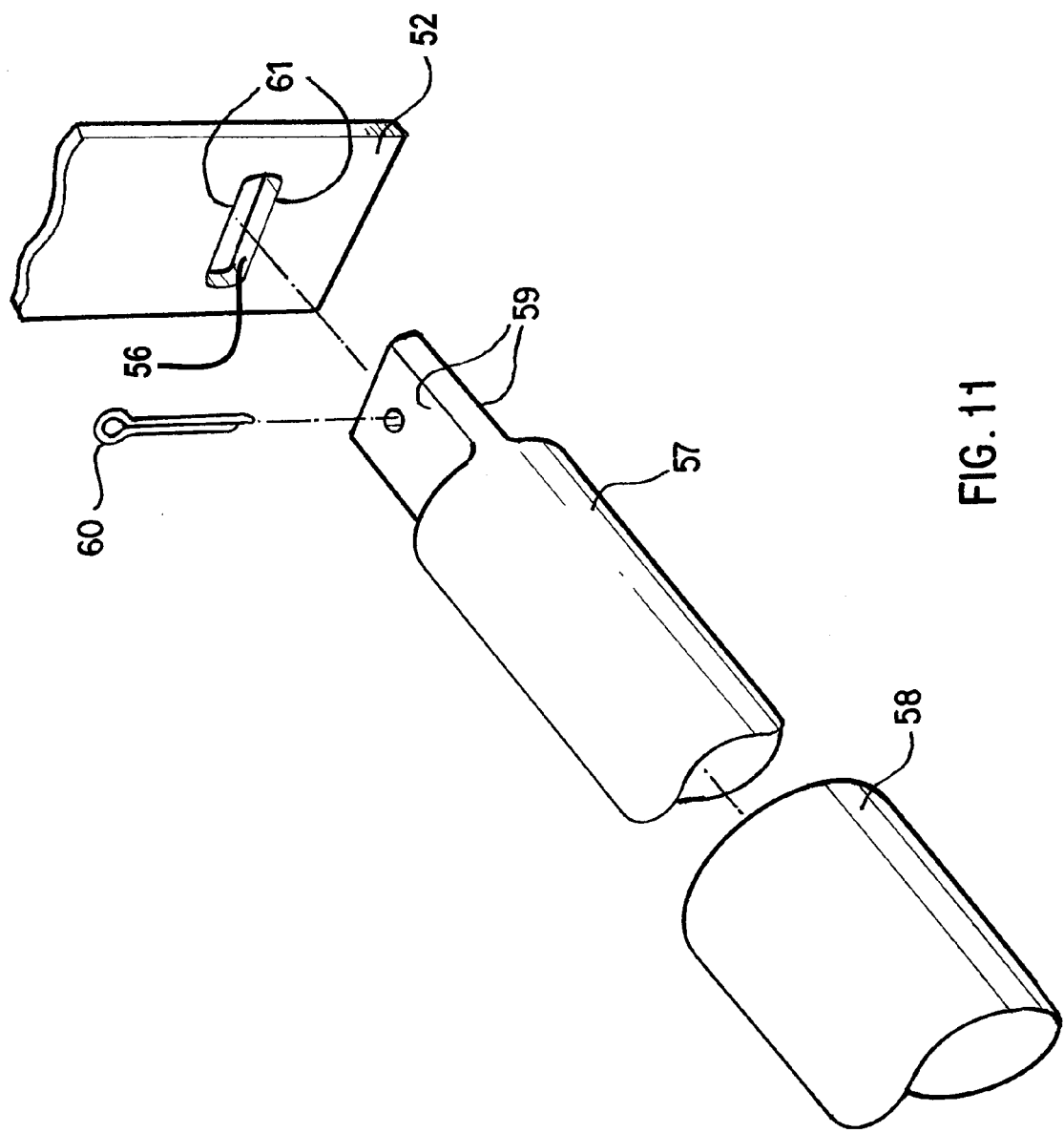

PARTITION SYSTEM

FIELD OF THE INVENTION

The present invention pertains to a partition system for subdividing a refrigerated chamber such as a truck trailer, railcar or cargo container.

BACKGROUND OF THE INVENTION

Refrigerated truck trailers and the like have long been used to transport perishable items. Insulated partitions or bulkheads have been used to subdivide the trailer interior to define chamber portions that can be maintained at different temperatures. For example, some trailers include multiple refrigerators located at the front, rear and/or midsection of the trailer's chamber. Partitions can be used to define two or three different refrigerated interior portions, each cooled to a unique temperature by one of the refrigerators. In this way, the same trailer can transport items that are desirably kept at different temperatures. Similarly, partitions can be used to enable refrigerated goods and non-refrigerated goods to be hauled in the same trailer. Partitions can also be used to improve the haul of a partially filled refrigerated truck trailer. For example, the goods can be loaded into one portion of the chamber, which is then enclosed by one or more partitions so that only a part of the trailer chamber needs to be refrigerated. Partitions can also be used to simply separate the goods to be delivered at different locations.

Many partitions in use today are manually fit into the truck trailer by the operator. They generally include a peripheral seal and extend laterally across the trailer chamber to subdivide the refrigerated chamber. They may at times be foldable about a vertical hinge to ease handling, installation and removal. In any event, the partitions tend to be heavy, bulky and difficult to place into their proper position. To resolve these difficulties, partitions have been shaped to correspond to only one-half of the trailer width in order to weigh less, and be more easily moved and put in place. In half-width partitions, two are placed in side-by-side abutment to subdivide the chamber. To further ease handling, some partitions have been mounted on rails for longitudinal movement in the chamber. In these constructions, the partitions are usually swung about hinges for movement between operative and loading positions.

In a partition system sold by ITW Insulated Products, two half-width partitions are mounted side-by-side on a single axle that is supported on each end by a trolley. Each trolley is movable along the length of a rail attached to one of the sidewalls adjacent the ceiling. In this system, the partitions are moved together along the rails to the desired longitudinal position. When the trailer is to be loaded or unloaded, the partitions are individually swung and latched to the ceiling. The half-width partitions are less weight and are thus easier to lift to the ceiling than a full width partition. Nevertheless, this system still requires the partitions to be moved together, and to be manually lifted and latched without mechanical assistance.

In U.S. Pat. No. 6,247,740, the partitions are individually mounted on separate axles, which are each mounted on a trolley. Each trolley moves along a rail extending across one of the sidewalls, and includes a hinge assembly that swings the partition either to the ceiling or the sidewall for loading or unloading of the trailer. The half-width partitions are more easily moved than full width partitions. However, the use of a single rail positioned along each of the sidewalls requires a relatively robust rail, trolley and axle assembly to prevent the partition from pulling from the wall. The trolley and axle assembly is also relatively complicated as compared to a single-axis hinge due to its ability to move to a loading position against the sidewall or ceiling. This system also includes lift ropes to ease lifting of the partitions when positioned along the ceiling. The ropes are hooked to anchors fixed to the sidewalls to hold the partitions in place during loading of the trailer. However, a taut segment of the lift rope extends downward along the sidewall when the partition is along the ceiling, thus risking being struck and damaged during loading of the goods into the trailer.

U.S. Pat. No. 6,626,625 discloses a partition system wherein half-width partitions are each separately mounted on a pair of trolleys movably attached to a plurality of spaced apart rails. One rail extends along each sidewall and two rails along the center of the ceiling. Each partition can be independently moved in a longitudinal direction and independently swung to the ceiling. Further, a lift rope is provided for lifting and lowering the partitions. The lift rope is fed through a control mechanism whereby a pivotal cam selectively holds and releases the rope as needed. However, since the pulleys and center rails are supported by the ceiling, the system can only be used in trailers constructed with ceilings able to support the necessary loads of the partition system. Moreover, operation of the cam via the lift rope requires a minimum clearance to laterally pull the rope for releasing the cam.

Further, goods transported in a refrigerated truck trailer are typically supported on pallets that are loaded and unloaded by fork lift trucks. The fork lift truck can at times mistakenly strike a partition set up to separate two partitioned areas. As the operators generally drive the fork lift trucks quickly, they can, at times, strike the partition with considerable force. In all current rail mounted partition systems, the partitions are fastened to the trolleys that are adapted to move along the rails. Such fastening can lead to breakage of the partitions when struck during loading or unloading of the goods.

SUMMARY OF THE INVENTION

The need exists for an improved partition system that provides the benefits sought by the industry without the previously concomitant disadvantages.

One object of the invention is to support the partition system solely by the sidewalls of the refrigerated chamber (e.g., a refrigerated truck trailer). In one preferred construction, a plurality of partial-width partitions are each mounted on a pair of rails for longitudinal movement, wherein the rails are part of a framework that is supported solely by the sidewalls of the trailer. In this way, an easy, reliable system is usable in refrigerated truck trailers that do not have load bearing ceilings.

Another object of the invention is to provide a lift assembly that is easy to use, reliable and economical. The inventive lift assembly eases movement of the partition to its loading position, forms no obstacles to loading of the goods, and requires only a few simple parts.

Another object of the invention is to releasably mount the partitions to trolleys supported by rails in the refrigerated chamber to avoid damage to the partition if it is struck during loading or unloading of the goods. The mounts permit the partition simply to disengage from the trolleys when struck with a certain force by a fork lift truck or other structure, thus, lessening the risk of damage and needed replacement.

In one preferred embodiment of the invention, the partition system includes two half-width partitions that are independently movable longitudinally in the trailer and independently swingable to the ceiling for easy movement to a loading position. Each partition is evenly supported by a pair of rails for easy movement without undue loading of the components. One rail extends along the sidewall and another along the center of the trailer for each partition. All of the rails are part of a framework that is supported solely by the sidewalls, i.e., with no loads placed on the ceiling. As a result, the system can be used in nearly all refrigerated trailers in use today.

A lift assembly in accordance with one embodiment of the invention includes a lift rope or other flaccid line, a pair of pulleys and a grip for holding the lift rope. A first pulley is generally aligned with the center of the partition. A second pulley guides the lift rope to a sidewall where it is less disruptive to the loading and unloading of goods. A grip for securing the lift rope is proximate the ceiling and avoids the formation of a taut rope segment along the sidewall. The grip has a simple construction that reliably holds the partition in the loading position as needed. In the preferred construction, the rails and lift assembly are each fully supported by the sidewalls without loading of the ceiling.

BRIEF DESCRIPTION OF THE DRAWINGS

FIG. 11 is a partial, exploded view of a partition mount.

DETAILED DESCRIPTION OF THE PREFERRED EMBODIMENTS

Figure 1:
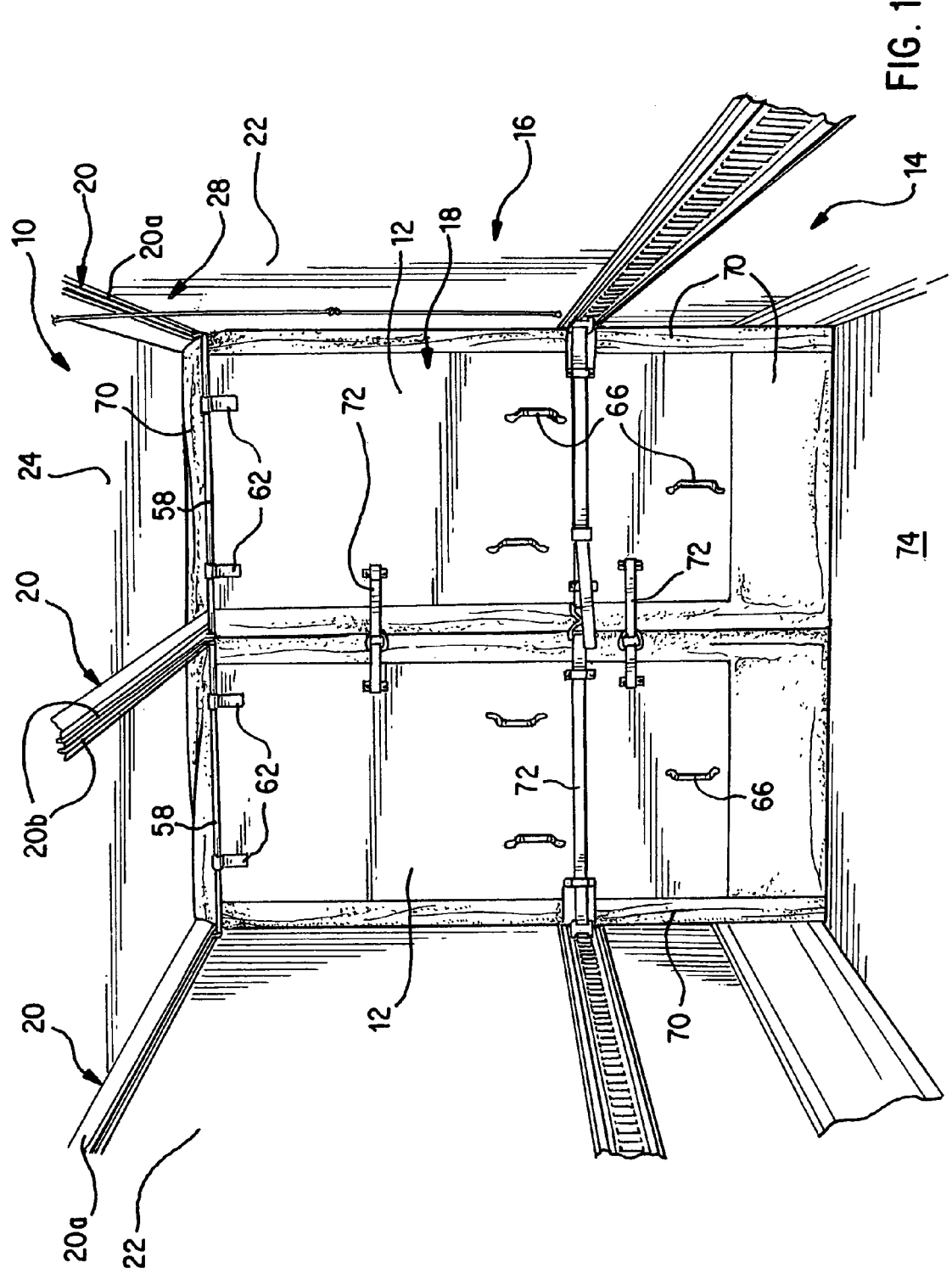
FIG. 1 shows a partition system in accordance with the present invention with two partitions in a side-by-side abutting relation to subdivide the refrigerated chamber.
Figure 2:
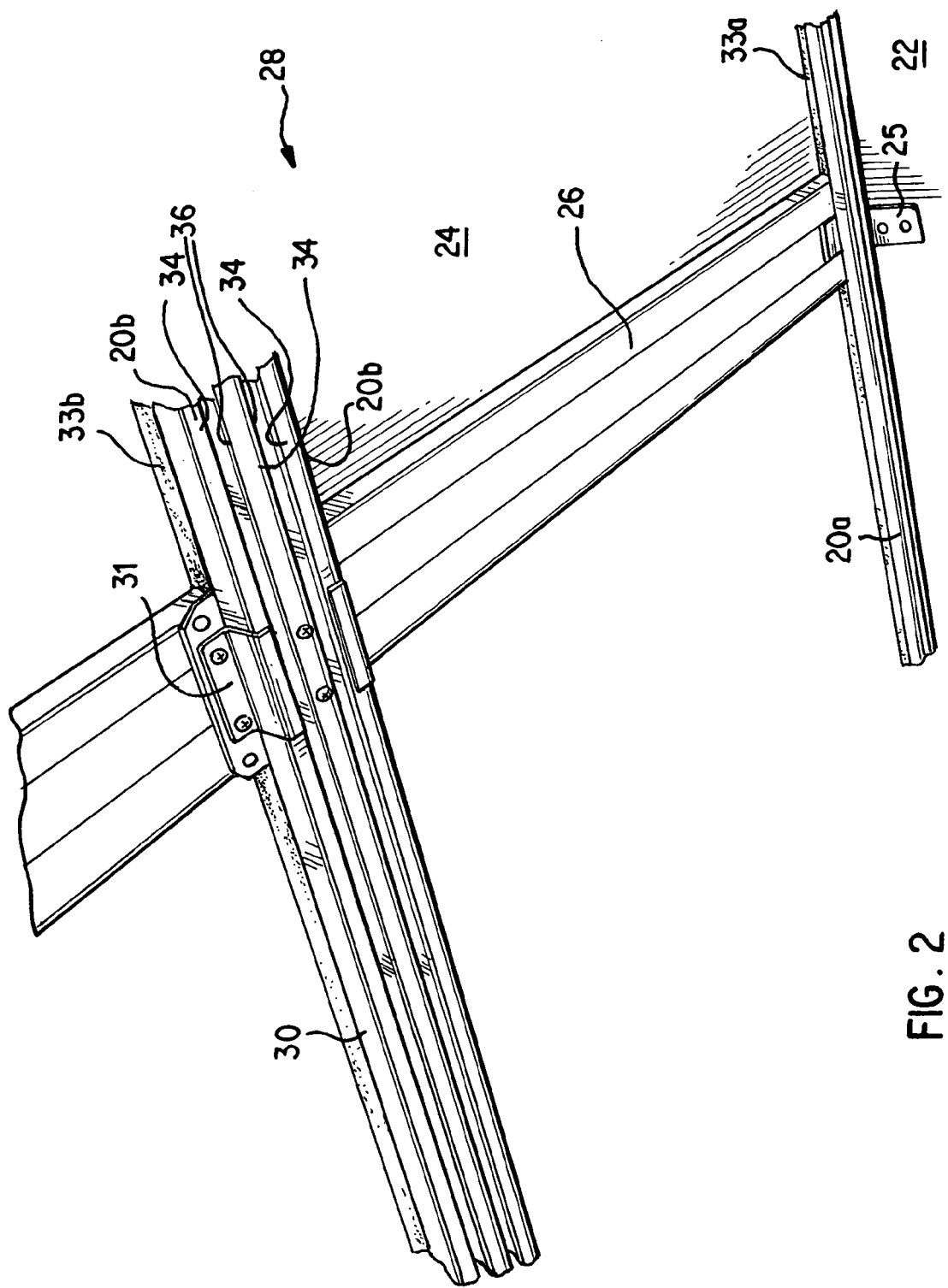
FIGS. 2 and 3 are partial views of the framework of the system.

A partition system 10 in accordance with the present invention subdivides a refrigerated chamber (FIGS. 1–10). The chamber may be the interior of a truck trailer, railcar, cargo container or other similar structure. While the invention is further described in connection with a truck trailer for ease of illustration, it is not limited to such use.

Partition system 10 preferably includes a plurality of partial-width partitions 12 that can be arranged to subdivide interior chamber 14 of truck trailer 16 (FIGS. 1, 4 and 9–10). In a preferred embodiment, the partitions each extend laterally across half the width of the chamber. Two partitions 12, then, can be placed in abutting relation to close the entire chamber and subdivide the chamber into two different partitioned areas or zones 18. Nevertheless, three or more partitions can be fit in side-by-side abutment across the width of the chamber in wide chambers. Each partition preferably has an identical construction, though there could be differences if desired. Further, each partition is also preferably insulated to better keep the chamber portions at the different desired temperatures.

Partition system 10 includes rails 20 to facilitate longitudinal movement of the partitions (FIGS. 1–4 and 6–8). Side rails 20a extend along sidewalls 22 of trailer 16 proximal to ceiling 24, and preferably are attached to the sidewalls via spaced brackets 25 secured by screws, rivets or the like. Cross bars 26 span the width of chamber 14 and also preferably attach to brackets 25, but could attach to side rails 20a. The number of cross bars to be used depends largely on the length of the chamber, the number of partitions used in the chamber, and/or the weight to be supported. In one preferred construction, three cross bars are provided—one adjacent front wall 27, one adjacent rear doors 29, and one centrally located. Center rails 20b are secured to the cross bars along the centerline of trailer 16 preferably by connectors 31. Rails 20 and cross bars 26 form a framework 28 that lies adjacent ceiling 24 and out of the way for loading and unloading of the trailer. Seal members 33a, 33b are preferably provided between rails 20a, 20b and ceiling 24 to better insulate one chamber portion 18 from another. Further, the entire framework is attached to and supported by the sidewalls 22, preferably through brackets 25, but could be attached to the sidewalls in other ways. For example, side rails 20a and cross bars 26 could be directly fixed to sidewalls 22 or framework 28 could be secured to sidewalls 22 through the use of various other components or supports. Framework 28 forms the base of partition system 10 and supports the remaining components. As a result, all of the weight of system 10 is supported by sidewalls 22, which is made to support loads in virtually all refrigerated truck trailers, without any loading of ceiling 24. Partition system 10 is therefore usable in nearly every refrigerated truck trailer irrespective of whether the ceiling is of the load-bearing kind.

Rails 20 each preferably have a generally U-shaped configuration with side portions 30, top portion 32 interconnecting side portions 30, and bottom lips 34 extending inwardly from side portions 30. Lips 34 extend only partially between side portions 30 so as to define a central slot 36. Nevertheless, rails 20 could have other shapes so long as they movably support partitions 12. Rails 20a, 20b also preferably have the same construction for ease and economics of manufacture, though different rail shapes could be used for the side and center rails. Further, the two center rails may be formed as a single integral member (not shown).

Figure 3:
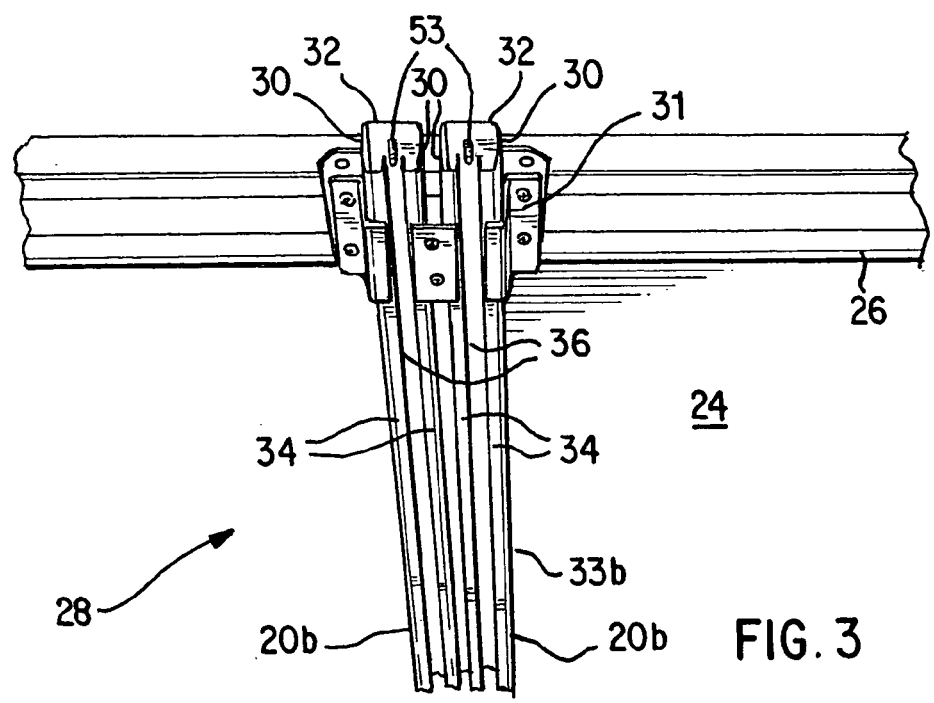
Figure 5:
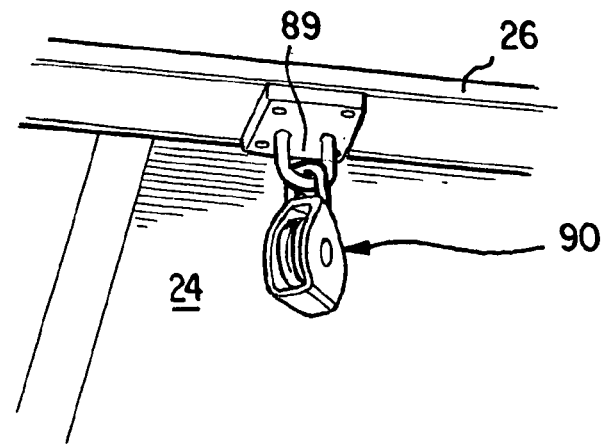
FIG. 5 shows a first pulley of the system.
Figure 4:
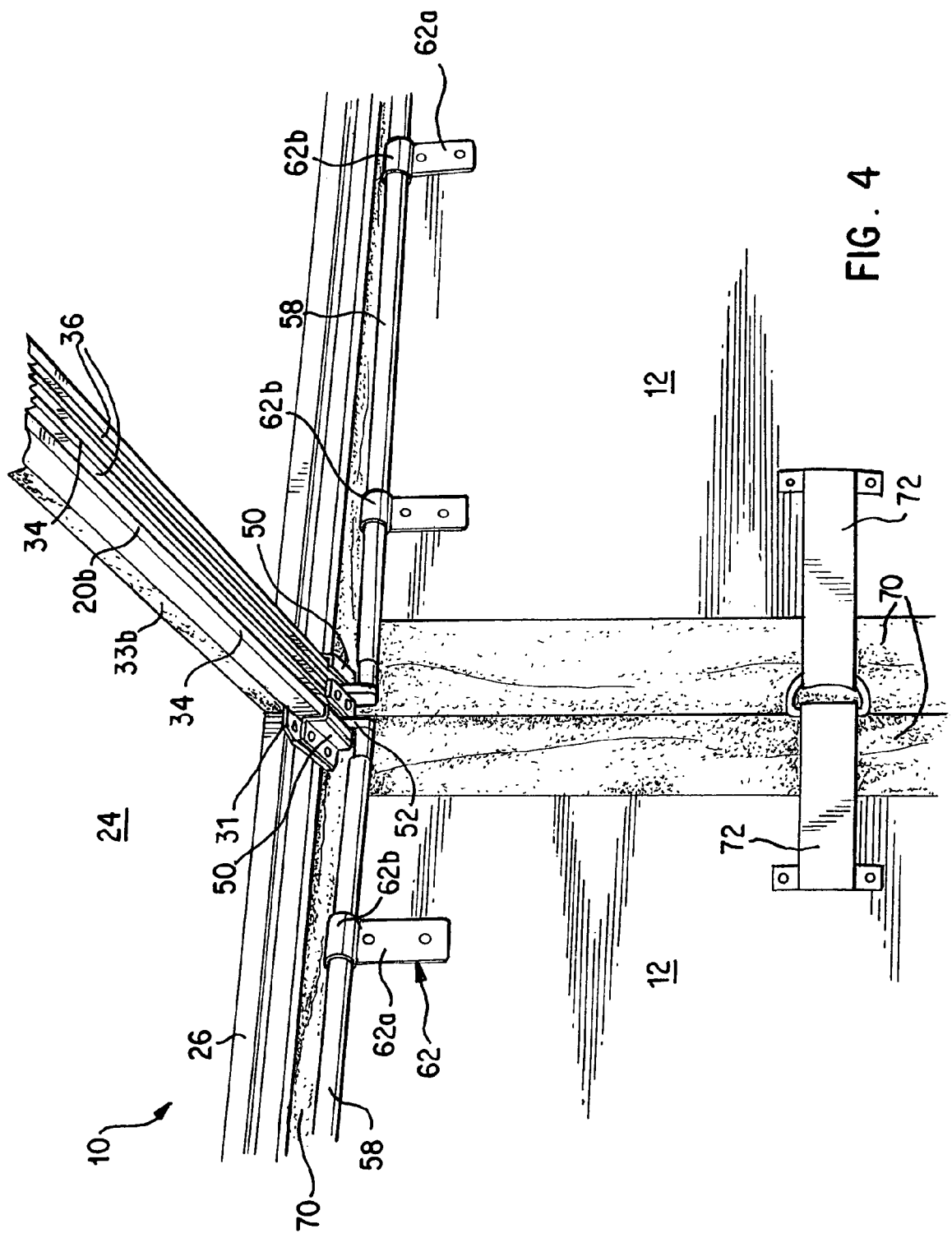
FIG. 4 shows the interconnection of the partitions to the trolleys and the trolleys to the center rails in the operative positions of the partitions.
Figure 6:
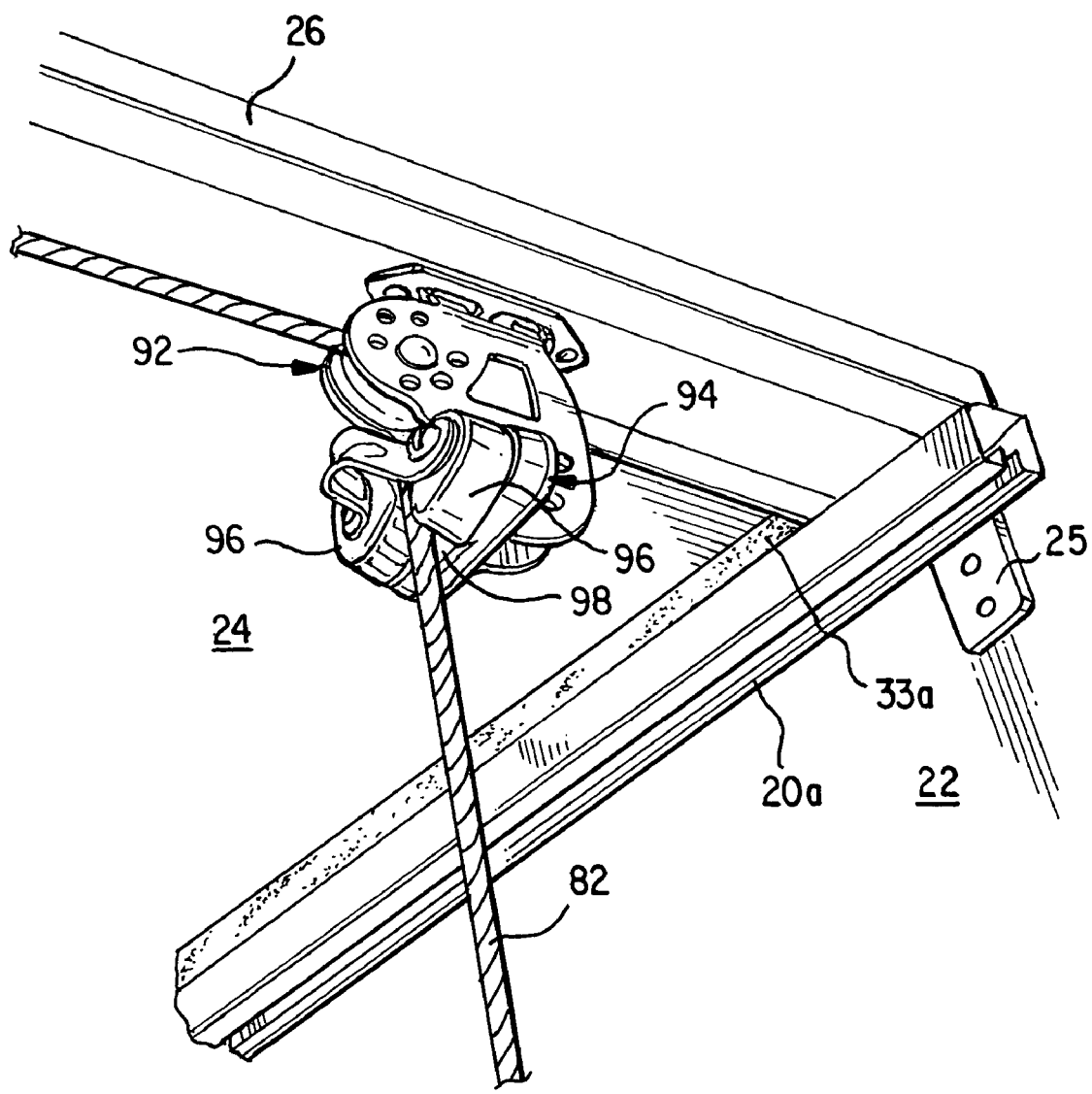
FIG. 6 shows a second pulley and grip of the system.
Figure 7:
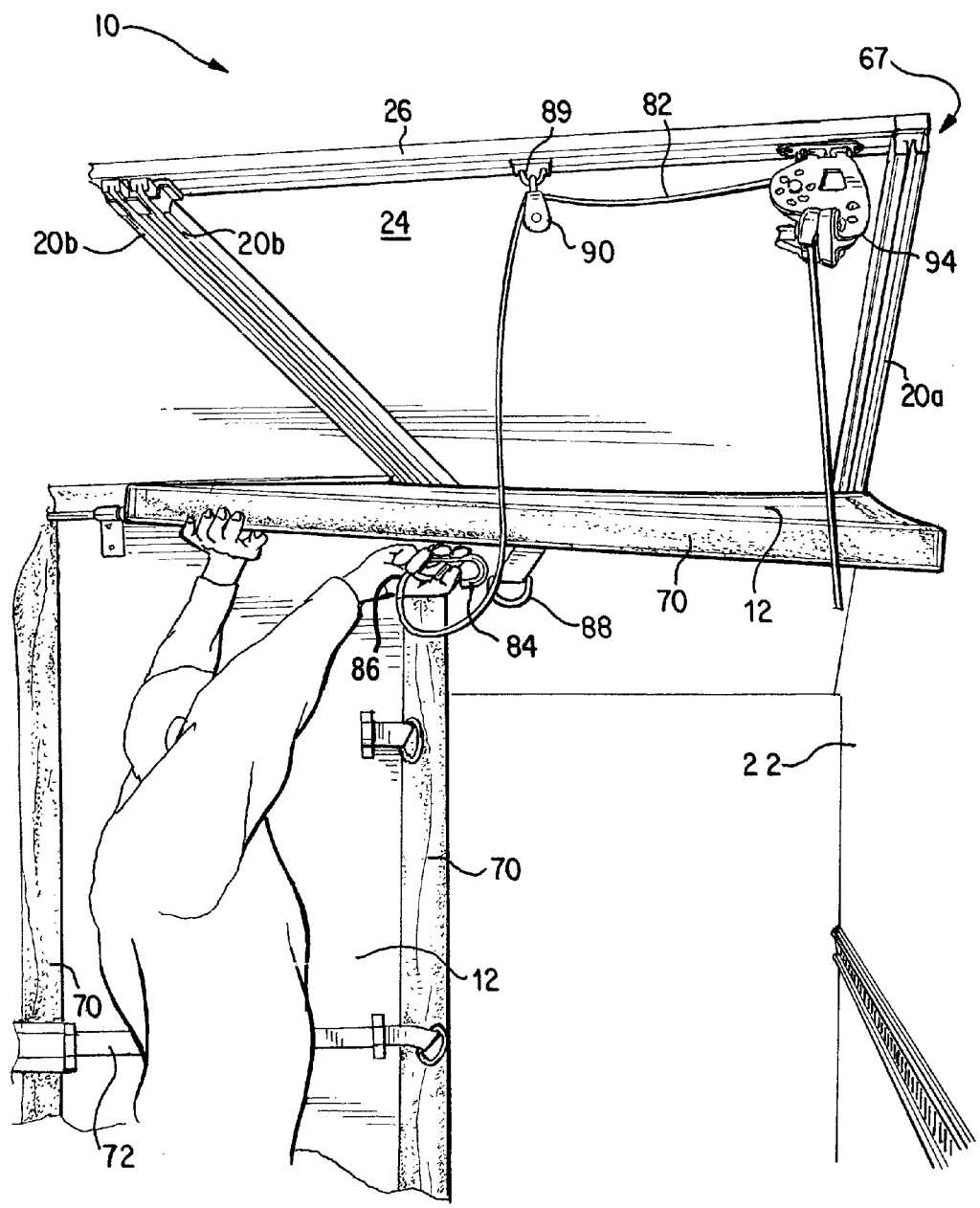
FIG. 7 shows connection of the lift assembly to one of the partitions.
Figure 8:
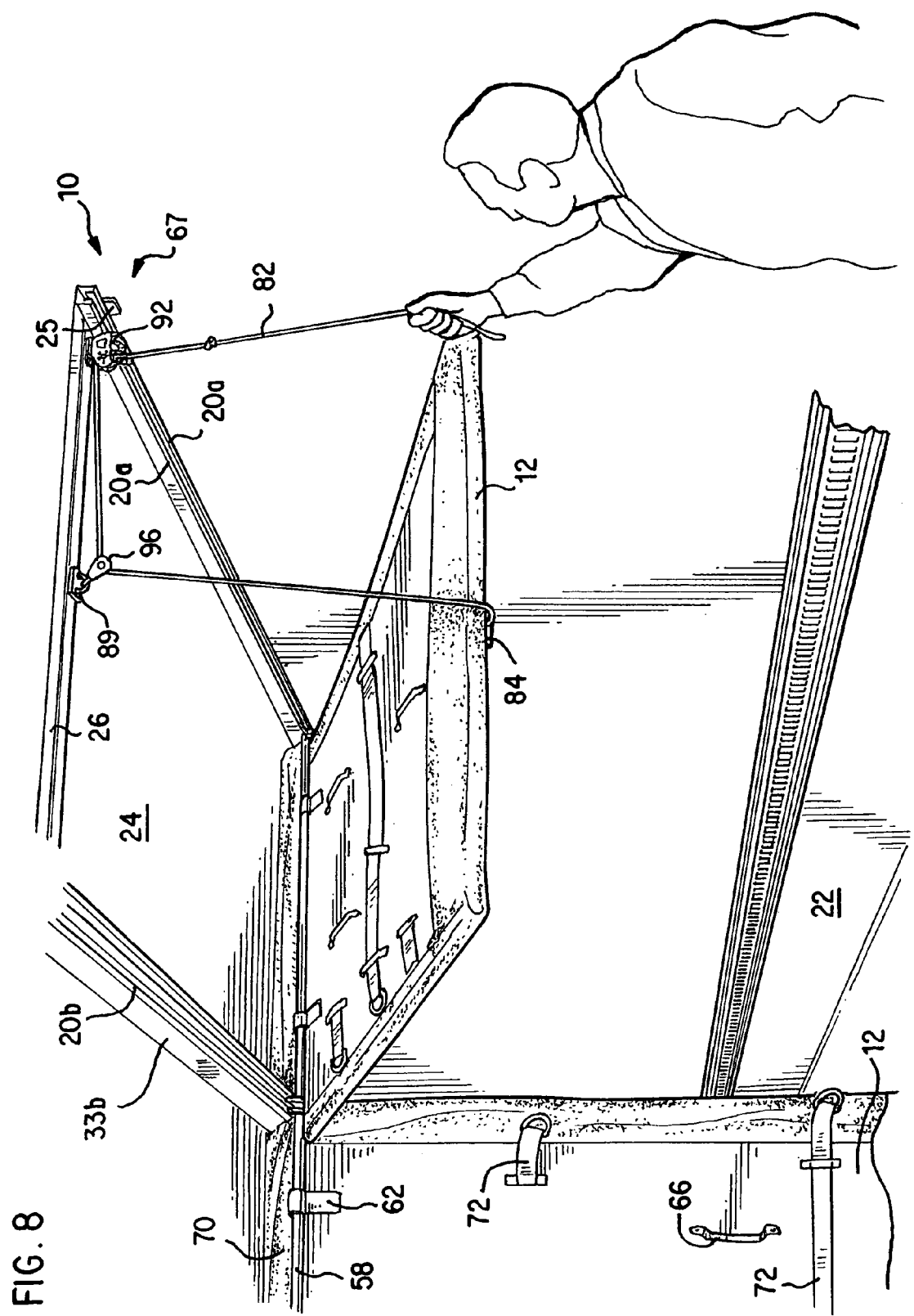
FIG. 8 shows lifting of one of the partitions by the lift assembly.

Trolleys 50 are movably supported on rails 20 and, in turn, support partitions 12 (FIG. 4). In one preferred construction, trolleys include a narrow body 52 that extends through slot 36 in rails 20. Rollers (not shown) are rotatably secured to the upper end of body 52 to ride along lips 34, though skids or other arrangements could be provided to facilitate movement of the trolley along rail 20. Screws 53 or other stops are provided in the ends of rails 20a, 20b to prevent inadvertent disconnection between trolleys 50 and rails 20a, 20b (FIG. 3). An opening 56 is defined in a lower end of body 52 for receiving a pin 57 (e.g., one foot in length) that fits within hollow rod 58 (FIGS. 1 and 4). In a preferred construction, pins 57 include flats 59 that cooperate with flats 61 in opening 56 (FIG. 11). These flats provide increased support for holding pins 57 and the weight of partition 12. Cotter pins 60 or the like are passed through pins 57 to hold them to trolleys 50. If the partitions are struck by a fork lift truck, pallet or other structure, there is sufficient clearance for pins 57 to move. Specifically, pins 57 are forced to pivot along generally a horizontal plane about opening 56, for example up to about 45°, toward the front of the trailer. This movement of pins 57 permits rod 58 to slide from one or both pins 57 and be separated from trolley(s) 50 to avoid damage to the partition. The partition can then be manually fit again onto the pins. Other releasable mounts could also be used.

Hinge plates 62 are rotatably mounted on each rod 58 for supporting partitions 12. Each hinge plate 62 has a main plate portion 62a bolted or otherwise secured to partition 12 and an eye 62b that defines an aperture through which rod 58 is passed. In this way, partition 12 is freely rotatable about rod 58. Of course, other trolley and hinge constructions could be used.

Each partition 12 preferably includes one or more handles 66 to facilitate their movement. In use, partitions 12 are pushed and/or pulled through chamber 14 by manually grasping one or more of the handles and causing the trolleys 50 to move along rails 20. For each partition, one trolley is supported by one side rail 20a and one other trolley is supported by one center rail 20b. This provides an even support for the partition, which makes for an easy and smooth longitudinal movement of the partition. Handles 66 may also grasped to pivot partition 12 about rod 58 to and from its loading position. The partition may be manually lifted and latched in a loading position against or close to framework 28 or swung about rod 58 by a lift assembly 67. In the loading position, chamber 14 can be loaded or unloaded without interference from partitions 12. Of course, the partitions could have a variety of different constructions, including with or without handles, straps, or specific seal members.

To subdivide chamber 14, two partitions are preferably placed in side-by-side abutment in the operative position (FIGS. 1, 4 and 9–10). Each partition preferably has a peripheral seal 70 to contact one sidewall 22, ceiling 24, an adjacent partition 12, and floor 74 to block the passage of air from one portion to the next. Seal 70 is preferably sufficiently compressible to provide clearance for rails 20 without jeopardizing the seal needed to adequately subdivide the refrigerated chamber into portions capable of sustaining two different temperatures. Alternatively, the partitions could be shaped to accommodate the rails. Partitions 12 also preferably include straps 72 by which the adjacent partitions may be strapped together to form a more secure fit across the chamber.

Partition system 10 further preferably includes a lift assembly 67 for swinging each partition 12 from the operative position to the loading position, and vice versa (FIGS. 5–8); although, a direct lifting and latching of the partitions by the operator without a lift assembly could be done. In the preferred construction, each lift assembly 67 includes a rope 82 or other flaccid member that includes a latch component 84 at the proximal end 86. Latch 84 secures to ring 88 or other lock element fixed to partition 12 when the partition is to be lifted by lift assembly 80. Ring 88 is preferably provided on one side of partition 12, i.e., the lower side when stowed, though it could be provided on the other side or both sides of the partition.

A first or lifting pulley 90 is attached to one cross bar 26, preferably the cross bar closest to rear doors 29, approximately over the location of ring 88 on partitions 12 (i.e., roughly the center of the partition). Another first lifting pulley could be provided on other cross bars if more than one pair of partitions is included in the trailer. The first pulley is preferably located centrally of the partition. The first pulley is preferably mounted on a U-shaped base 89 to enable the pulley to freely orient itself as needed to connect to and lift the partition. A locking or second pulley 92 is also attached to the same cross bar 26 near side rail 20a to a position out of the way of the goods. Second pulley 92 includes a grip or tackle 94 (e.g., as commonly used in sailing) that automatically holds the rope from moving in the release direction. Grip 94 is preferably integral with second pulley 92 but could be a separate member if desired. Grip 94 includes a pair of spring-biased, eccentric jaws 96, preferably with serrations 98, which are normally biased toward the closed position. In use, rope 82 passes around first pulley 90, to and around second pulley 92, and through jaws 96 of grip 94. The jaws are pushed outward to an open position for passage of the rope. The jaws are biased toward the closed position to press against the rope. The jaws securely hold the rope in place and prevent slippage or release of the partition from the loading position. To release the partition to the operative position, rope 82 is pulled transversely out of grip 94 and the rope permitted to freely slide back over pulleys 90, 92 under the weight of partition 12. A stop, preferably in the form of a generally U-shaped bar, is set across from jaws 96 to prevent pulling the rope from pulley 92. With the partition lowered, hook 84 is released from ring 88. Partition 12 can then be moved longitudinally along rails 20 to the desired position.

Figure 9:
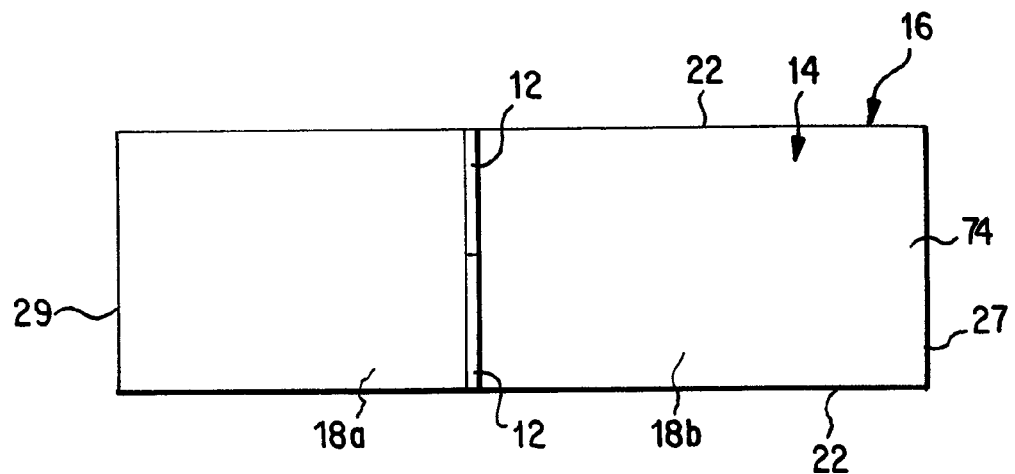
FIG. 9 is a top schematic view showing the system in the chamber.
Figure 10:
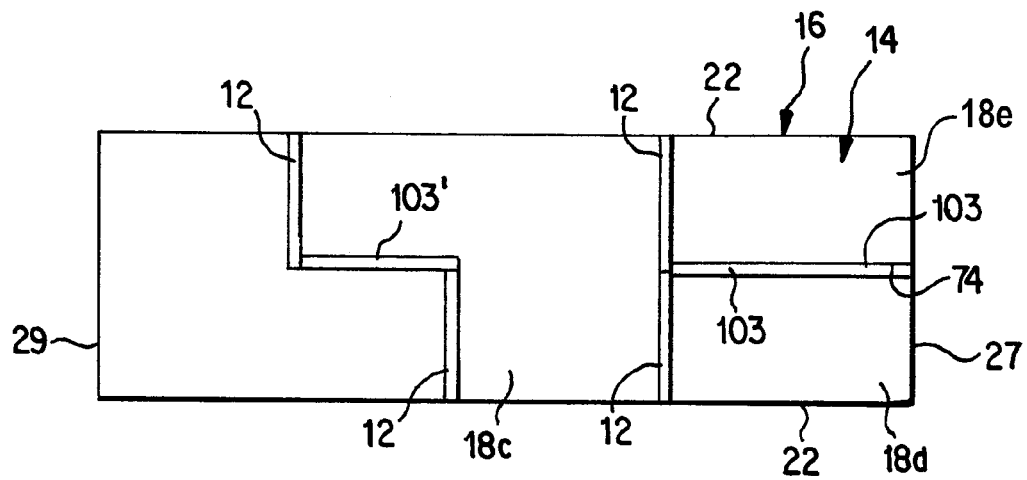
FIG. 10 is a top schematic view showing the system in an alternative arrangement in the chamber.

In one embodiment, one or more partitions are mounted on each pair of rails 20a, 20b to subdivide chamber 14 into two or more chamber portions, e.g., chamber portions 18a, 18b (FIGS. 1 and 9). In an alternative construction, a longitudinal partition or bulkhead 103 can be mounted along the centerline of the bulkhead to subdivide the bulkhead longitudinally as well as laterally to form multiple chamber portions, e.g., chamber portions 18c, 18d, 18e (FIG. 10). While longitudinal partitions 103 are preferably of conventional design and held in place by friction, they could be fabricated for suspension from framework 28. Longitudinal partitions 103' can also be used with partitions 12 to form a z-shaped partition border, which can be useful when an odd number of pallets are loaded into the refrigerated chamber.

The above discussion concerns the preferred embodiments of the present invention. Various other embodiments as well as many changes and alterations may be made without departing from the spirit and broader aspects of the invention as claimed. For example, the use of a framework of rails and cross members supported solely by the sidewalls of the chamber could be used with other partition systems. Also, the lift assembly and the use of mounts that permit release of the partitions when struck could be effectively used with many different partition systems, including those with single axles or full width partitions.

The invention claimed is:

1. A partition system for subdividing a refrigerated chamber defined by sidewalls, a ceiling and a floor, the partition system comprising:
   a framework supported within the chamber and including longitudinal rails extending along the sidewalls and along a mid-portion of the chamber, the framework being arranged in proximity to the ceiling and placing no lead on the ceiling;
   a trolley supported on each said rail for longitudinal movement in the chamber; and
   a plurality of partitions each supported by a pair of the trolleys mounted on a pair of the spaced apart rails, the partitions being attached to the trolleys for pivotal movement about an axis, each partition being movable longitudinally within the chamber by movement of the trolleys along the rails, and swung about the axis between an operative position where the partition extends generally perpendicular to the ceiling and a loading position where the partition extends generally parallel to the ceiling in close proximity to the framework, and wherein at least two of said partitions when in the operative positions can be placed in side-by-side abutment with each other to close the chamber across a width thereof to subdivide the chamber into two separate chamber portions capable of being maintained at different temperatures.

2. A partition system in accordance with claim 1 wherein the framework is supported solely by the sidewalls of the chamber.

3. A partition system in accordance with claim 2 wherein the framework includes a plurality of cross bars that extend laterally across the chamber and support the longitudinal rails positioned along the mid-portion of the chamber.

4. A partition system in accordance with claim 3 further including a plurality of rods each supported between a pair of trolleys and each supporting one of said partitions by at least one hinge structure.

5. A partition system in accordance with claim 1 wherein the partitions are releasably supported by the trolleys such that the partition is released when struck by a predetermined force.

6. A partition system in accordance with claim 1 further including a lift assembly for each of the partitions to swing the partitions between the operative and loading positions.

7. A partition system in accordance with claim 6 wherein each said lift assembly includes a flaccid line attached to one said partition, and a grip proximate the ceiling for releasably holding the flaccid line to prevent unwanted movement of the respective partition toward the operative position.

8. A partition system for subdividing a refrigerated chamber defined by sidewalls, a ceiling and a floor, the partition system comprising:
   a framework mounted within the chamber in proximity to the ceiling;
   at least one trolley supported on the framework for longitudinal movement in the chamber;
   at least one partition supported by the trolley for pivotal movement about an axis, the partition being movable longitudinally within the chamber by movement of the trolley along the framework, and swingable about an axis between an operative position where the partition extends generally perpendicular to the ceiling and a loading position where the partition extends generally parallel to the ceiling in close proximity to the framework; and
   a lift assembly for each said partition to swing the partition between the operative and loading positions, each said lift assembly including a first support attached to the framework near a centerline of the partition, a second support attached to the framework near one of the sidewalls of the chamber, a flaccid line attachable to a lower portion of the partition and extending over the first and second supports, and a grip near the second support for receiving the flaccid line, the grip permitting pulling of the flaccid line to move the partition to the loading position and preventing movement of the flaccid line to move the partition to the operative position, the flaccid line being removable from the grip to move the partition to the operative position.

9. A partition system in accordance with claim 8 wherein the first and second supports are pulleys.

10. A partition system in accordance with claim 8 wherein the grip includes spring biased jaws that automatically grip and hold the flaccid line when the line moves in a direction consistent with the partition moving to the operative position.

11. A partition system in accordance with claim 8 wherein the grip and second support are formed as an integral unit.

12. A partition system in accordance with claim 8 wherein the framework places no load on the ceiling of the chamber.

13. A partition system in accordance with claim 8 wherein the framework is supported solely by the sidewalls of the chamber.

14. A partition system for subdividing a refrigerated chamber defined by sidewalls, a ceiling and a floor, the partition system comprising:
   at least one rail mounted within the chamber in proximity to the ceiling;
   at least one trolley supported on each said rail for longitudinal movement in the chamber;
   at least one partition; and
   a connection assembly for releasably attaching the partition to the trolley such that the partition is released when struck by a predetermined force, the partition being movable longitudinally within the chamber by movement of the trolley along the at least one rail.

15. A partition system in accordance with claim 14 wherein the connection assembly supports the partition for movement about an axis between an operative position where the partition extends generally perpendicular to the ceiling and a loading position where the partition extends generally parallel to the ceiling in proximity to the rail.

16. A partition system in accordance with claim 15 including a plurality of said trolleys for supporting each partition, each trolley being supported by one said rail, wherein one said connection assembly attaches the partition to each said trolley.

17. A partition system in accordance with claim 16 further including a plurality of rods each supported between a pair of said trolleys and each supporting one said partition by at least one hinge structure.

18. A partition system in accordance with claim 17 wherein each said rod is releasably supported on pins attached to the trolleys.

19. A partition system in accordance with claim 14 further including a lift assembly for each of the partitions to swing the partition between the operative and loading positions.

20. A partition system in accordance with claim 19 wherein each said lift assembly includes a flaccid line attached to one said partition, and a grip proximate the ceiling for releasably holding the flaccid line to prevent unwanted movement of the respective partition toward the operative position.

* * * * *